United States Patent
Stenson

(10) Patent No.: US 9,871,378 B2
(45) Date of Patent: *Jan. 16, 2018

(54) PARALLELING MODULE FOR A GENERATOR SYSTEM

(71) Applicant: Kohler Co., Kohler, WI (US)

(72) Inventor: Chad Stenson, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 406 days.

This patent is subject to a terminal disclaimer.

(21) Appl. No.: 14/675,412

(22) Filed: Mar. 31, 2015

(65) Prior Publication Data

US 2015/0207326 A1 Jul. 23, 2015

Related U.S. Application Data

(63) Continuation-in-part of application No. 13/630,367, filed on Sep. 28, 2012, now Pat. No. 9,548,612.

(51) Int. Cl.
*H02J 3/38* (2006.01)
*H02K 7/18* (2006.01)
(Continued)

(52) U.S. Cl.
CPC ............ *H02J 3/381* (2013.01); *H02K 7/1815* (2013.01); *H02P 9/08* (2013.01); *H02B 1/22* (2013.01);
(Continued)

(58) Field of Classification Search
CPC ....................................... H02J 3/381
(Continued)

(56) References Cited

U.S. PATENT DOCUMENTS 4,233,555 A 11/1980 Roche
4,405,892 A 9/1983 Staerzl
(Continued)

FOREIGN PATENT DOCUMENTS

EP 1006641 A2 6/2000
WO WO-2008/040003 4/2008

OTHER PUBLICATIONS

"U.S. Appl. No. 13/630,367, Examiner Interview Summary dated Apr. 14, 2016", 3 pgs.
(Continued)

*Primary Examiner* — Joseph Chang
(74) *Attorney, Agent, or Firm* — Schwegman Lundberg & Woessner, P.A.

(57) ABSTRACT

A power management system that includes a first enclosure and a second enclosure. A first generator is inside the first enclosure and a second generator is inside the second enclosure. The power management system further includes a paralleling enclosure and a paralleling module inside the paralleling enclosure. The paralleling module electrically connects the first generator to the second generator without opening the paralleling enclosure. The first generator includes an engine and an alternator. A first contactor is powered by the alternator to close the first contactor in order to provide an electrically conductive path from the alternator to an output. The second generator includes an engine and an alternator. A second contactor is powered by the alternator to close the contactor in order to provide an electrically conductive path from the alternator to the output.

13 Claims, 14 Drawing Sheets

(51) Int. Cl.
  *H02P 9/08*  (2006.01)
  *H02B 1/22*  (2006.01)
  *H02J 9/06*  (2006.01)

(52) U.S. Cl.
  CPC ............. *H02J 9/066* (2013.01); *Y10T 307/62* (2015.04); *Y10T 307/724* (2015.04)

(58) Field of Classification Search
  USPC .......................................................... 307/85
  See application file for complete search history.

(56) References Cited

U.S. PATENT DOCUMENTS

| | | | |
|---|---|---|---|
| 4,631,455 A | | 12/1986 | Taishoff |
| 4,677,269 A | * | 6/1987 | Tringali .................. H01H 1/50 |
| | | | 200/324 |
| 5,252,905 A | | 10/1993 | Wills et al. |
| 5,552,954 A | | 9/1996 | Glehr |
| 5,625,276 A | | 4/1997 | Scott et al. |
| 5,694,027 A | | 12/1997 | Satake et al. |
| 5,886,890 A | | 3/1999 | Ishida et al. |
| 6,624,617 B2 | | 9/2003 | Holzer et al. |
| 6,657,416 B2 | | 12/2003 | Kern et al. |
| 7,453,240 B2 | | 11/2008 | Yamauchi et al. |
| 7,492,051 B1 | | 2/2009 | Chung |
| 7,550,953 B2 | | 6/2009 | Shah |
| 7,554,303 B1 | | 6/2009 | Kawamura |
| 7,939,962 B2 | | 5/2011 | Foch et al. |
| 8,129,863 B2 | | 3/2012 | Eguchi et al. |
| 9,548,612 B2 | * | 1/2017 | Stenson .................. H02J 3/381 |
| 2003/0122360 A1 | | 7/2003 | Badr et al. |
| 2006/0244327 A1 | | 11/2006 | Kundel |
| 2007/0262661 A1 | | 11/2007 | Ai |
| 2010/0007207 A1 | | 1/2010 | Peuser |
| 2011/0149624 A1 | | 6/2011 | Yamanaka |
| 2012/0007431 A1 | | 1/2012 | Jang et al. |
| 2012/0205986 A1 | | 8/2012 | Frampton et al. |
| 2013/0113442 A1 | | 5/2013 | Kawamura |
| 2013/0119948 A1 | | 5/2013 | Bekiarov |
| 2013/0200699 A1 | | 8/2013 | Origane et al. |
| 2013/0293023 A1 | | 11/2013 | Collie |
| 2014/0001873 A1 | | 1/2014 | Tian et al. |
| 2014/0091632 A1 | | 4/2014 | Stenson |

OTHER PUBLICATIONS

"U.S. Appl. No. 13/630,367, Non Final Office Action dated Mar. 24, 2016", 10 pgs.
"U.S. Appl. No. 13/630,367, Notice of Allowance dated Sep. 12, 2016", 7 pgs.
"U.S. Appl. No. 13/630,367, Response filed Jun. 30, 2016 to Non Final Office Action dated Mar. 24, 2016", 9 pgs.
"European Application Serial No. 13 184 361.7, Office Action dated May 17, 2016", (dated May 17, 2016), 7 pgs.
"U.S. Appl. No. 13/630,367, Examiner Interview Summary dated Feb. 23, 2015", 2 pgs.
"U.S. Appl. No. 13/630,367, Final Office Action dated Mar. 13, 2015", 14 pgs.
"U.S. Appl. No. 13/630,367, Non Final Office Action dated Oct. 24, 2014", 13 pgs.
"U.S. Appl. No. 13/630,367, Response filed Feb. 6, 2015 to Non Final Office Action dated Oct. 24, 2014", 10 pgs.
"European Application No. 13184361.7, Extended European Search Report dated Aug. 21, 2014", (dated Aug. 21, 2014), 9 pgs.
"U.S. Appl. No. 13/630,367, Examiner Interview Summary dated Jul. 13, 2015", 3 pgs.
"U.S. Appl. No. 13/630,367, Response filed Jul. 8, 2015 to Final Office Action dated Mar. 13, 2015", 9 pgs.
"European Patent Office Application No. 13184361.7, Communication pursuant to Article 94(3) EPC dated Nov. 6, 2015", (dated Nov. 6, 2015), 6 pgs.
"European Patent Office Application No. 13184361.7, Extended European Search Report dated Sep. 2, 2014", (dated Sep. 2, 2014), 9 pgs.

* cited by examiner

PARALLELING MODULE FOR A GENERATOR SYSTEM

CLAIM OF PRIORITY

This application is a continuation-in-part of and claims the benefit of priority to U.S. patent application Ser. No. 13/630,367, filed on Sep. 28, 2012, the benefit of priority of which is claimed hereby, and which is incorporated herein in its entirety.

TECHNICAL FIELD

The present invention relates to a power generation system, and more particularly to a paralleling module for a power generation system.

BACKGROUND

Standby generators are often used to provide electrical power when power is unavailable from an electric utility company (e.g. during weather disturbances). In addition, standby generators are often used to provide electrical power at a remote location where utility company power is not available.

One type of standby electric generator comprises an internal combustion engine driving an electrical alternator that produces alternating electricity. Other types of standby electric generators include photovoltaic arrays and wind turbine generators.

When a situation may require large amounts of standby power, there can be advantages to employing multiple small generators rather than a single large generator. One of the advantages is that, if one generator fails or requires maintenance, a multi-generator system is still able to supply some power, which would not be with a single generator system.

In addition, if a situation requires greater capacity than what can be provided by an existing single generator system, then the single generator system can be readily turned into a multi-generator system by adding another generator. Adding a generator may be more desirable than bearing the cost of replacing a single generator with an even larger generator.

It should be noted that relatively larger generators often present difficulties in shipping and installation complexity. Therefore, by using several smaller generators the overall generator weight may be distributed over a broader area potentially avoiding the need for special strengthening of the supporting area (e.g. of a roof).

Traditionally, generator paralleling systems have been quite complex and often require several additional pieces of equipment to achieve satisfactory generator paralleling. As examples, existing systems may include separate synchronizers, load managers, and/or switch gear. In addition, traditional systems are not well suited to address mechanical and electrical load differences.

Therefore, a need exists for a power management system that is able to readily parallel multiple generators. In addition, these multi-generator systems that provide standby power should not require an extensive amount of additional equipment (and cost) in order to parallel multiple generators.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
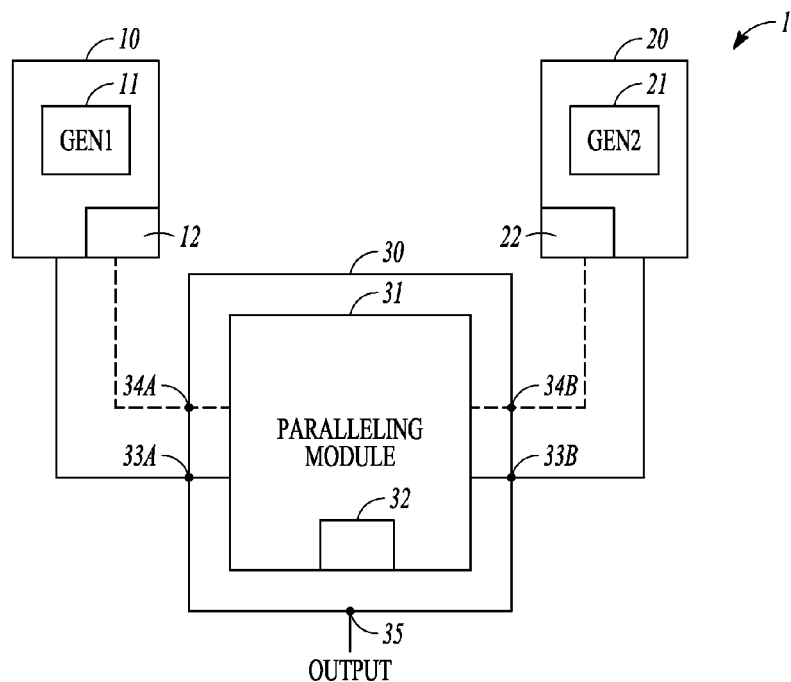
FIG. 1 is a schematic diagram showing an example paralleling module for a generator system.

FIG. 1 illustrates an example power management system 1. The power management system 1 includes a first enclosure 10 and a second enclosure 20. A first generator 11 is inside the first enclosure and a second generator 21 is inside the second enclosure 20.

The power management system 1 may further include a paralleling enclosure 30 and a paralleling module 31 inside the paralleling enclosure 30. The paralleling module 31 includes at least one switching device 32 within the paralleling enclosure 30 to electrically connect the first generator 11 to the second generator 21. The paralleling enclosure 30 further includes a plurality of connectors 33A, 33B, 35 that permit electrical connection between the paralleling module 31 and the first generator 11 (connector 33A), the second generator 21 (connector 33B) and an output (connector 35) without opening the paralleling enclosure 30.

In some embodiments, the first generator 11 includes a first generator controller 12 inside the first enclosure 10 and the second generator 21 includes a second generator controller 22 inside the second enclosure 20. As shown in FIG. 1, at least some plurality of connectors 34A, 34B on the paralleling enclosure 30 permit electrical connection between the paralleling module 31 and the first generator controller 12 (connector 34A) and the second generator controller 12 (connector 34B) without opening the paralleling enclosure 30. Embodiments are contemplated where the paralleling module 31 allows the first generator controller 11 and the second generator controller 21 to exchange signals.

Figure 2:
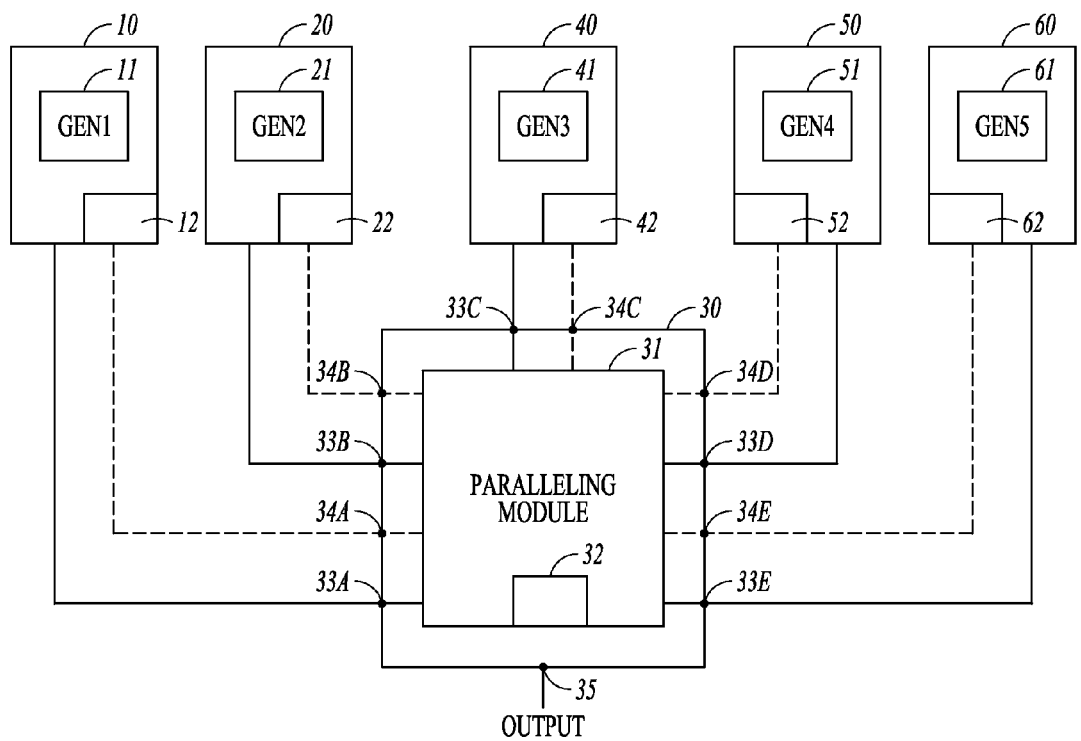
FIG. 2 is a schematic diagram showing the generator system of FIG. 1 where the generator system includes additional parallel generators.

FIG. 2 shows an example embodiment of the power management system 1 where the power management system 1 further includes a plurality of additional enclosures 40, 50, 60 and a plurality of additional generators 41, 51, 61 where each of the additional generators 41, 51, 61 is inside one of the additional enclosures 40, 50, 60. The at least one switching device 32 in the paralleling module 31 within the paralleling enclosure 30 may electrically connect the plurality of additional generators 41, 51, 61 with the first generator 11 and the second generator 12. In addition, the plurality of connectors 33C, 33D, 33E on the paralleling enclosure 30 may further permit electrical connection of the plurality of additional generators 41, 51, 61 with the first generator 11, the second generator 21 and the output without opening the paralleling enclosure 30.

In some embodiments, each of the additional generators 41, 51, 61 includes a generator controller 42, 52, 62 located inside one of the respective additional enclosures 40, 50, 60. At least some plurality of connectors 34C, 34D, 34E on the paralleling enclosure 30 permit electrical connection between each of the generator controllers 12, 22, 42, 52, 62 without opening the paralleling enclosure 30. As an example, the paralleling module 31 may allow each of the generator controllers 12, 22, 42, 52, 62 to exchange signals.

Figure 3:
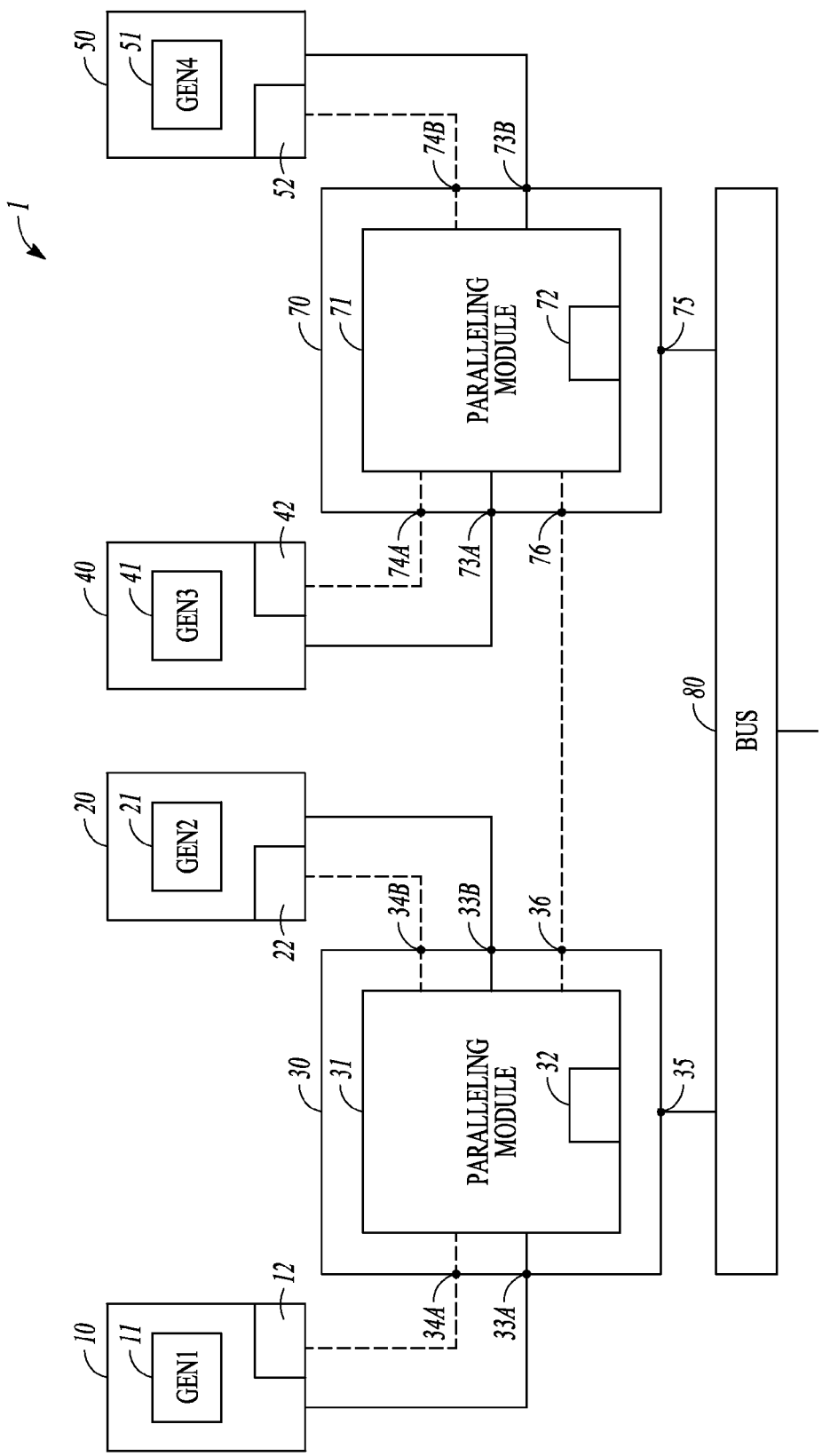
FIG. 3 is a schematic diagram showing the generator system of FIG. 1 where the generator system includes additional parallel generators and an additional paralleling module.

In the example embodiment that is shown in FIG. 3, the power management system 1 further includes a third enclosure 40 and a fourth enclosure 50. A third generator 41 is inside the third enclosure 40 and a fourth generator 51 inside the fourth enclosure 50. The power management system 1 further includes an additional paralleling enclosure 70 and an additional paralleling module 71 inside the additional paralleling enclosure 70.

The additional paralleling module 71 includes at least one switching device 72 within the additional paralleling enclosure 70 to electrically connect the third generator 41 to the fourth generator 51. The paralleling enclosure 70 further includes a plurality of connectors 73A, 73B, 75 that permit electrical connection between the paralleling module 71 and the third generator 41 (connector 73A), the fourth generator 51 (connector 73B) and an output (connector 75) without opening the additional paralleling enclosure 71.

In some embodiments, a bus 80 is electrically connected to the output of the paralleling module 31 and the output of the additional paralleling module 71. As an example, the bus 80 may selectively receive current from the paralleling module 31 and/or the additional paralleling module 71.

As shown in FIG. 3, the third generator 41 may include a third generator controller 42 inside the third enclosure 40 and the fourth generator 51 may include a fourth generator controller 52 inside the fourth enclosure 50. At least some of the plurality of connectors 74A, 74B on the additional paralleling enclosure 70 may permit electrical connection between the third generator controller 42 and the fourth generator controller 52 without opening the additional paralleling enclosure 70. As an example, the additional paralleling module 71 may allow the third generator controller 42 and the fourth generator controller 52 to exchange signals.

In some embodiments, at least one of the plurality of connectors 36 on the paralleling enclosure and at least one of the plurality of connectors 76 on the additional paralleling enclosure 70 permit electrical connection between the paralleling module 31 and the additional paralleling module 71. Embodiments are contemplated where the power management system 1 includes additional connectors on the paralleling enclosure 30 and additional connectors on the additional paralleling enclosure 70 in order to permit a variety of electrical connections between the generators, generator controllers and/or paralleling modules.

It should be noted that the size, type, number and location of the generators, generator controllers, paralleling modules and connectors may vary depending on the application where the power management system 1 is to be used (among other factors). In addition, the need for the paralleling modules to pass communications (i.e., signals) to one another will depend in part on the application where the power management system 1 is to be used (among other factors).

One example type of generator that may be utilized in the power management system 1 includes an internal combustion engine that drives an electrical alternator to produce alternating electricity. The internal combustion engine and the electrical alternator are housed inside an enclosure that protects the internal combustion engine and the electrical alternator from the environment where the generator is located.

The power management system 1 described herein may be able to readily parallel multiple generators. The power management system 1 may also be able to parallel multiple generators without requiring an extensive amount of additional equipment (and cost) in order to parallel multiple generators.

Figure 4:
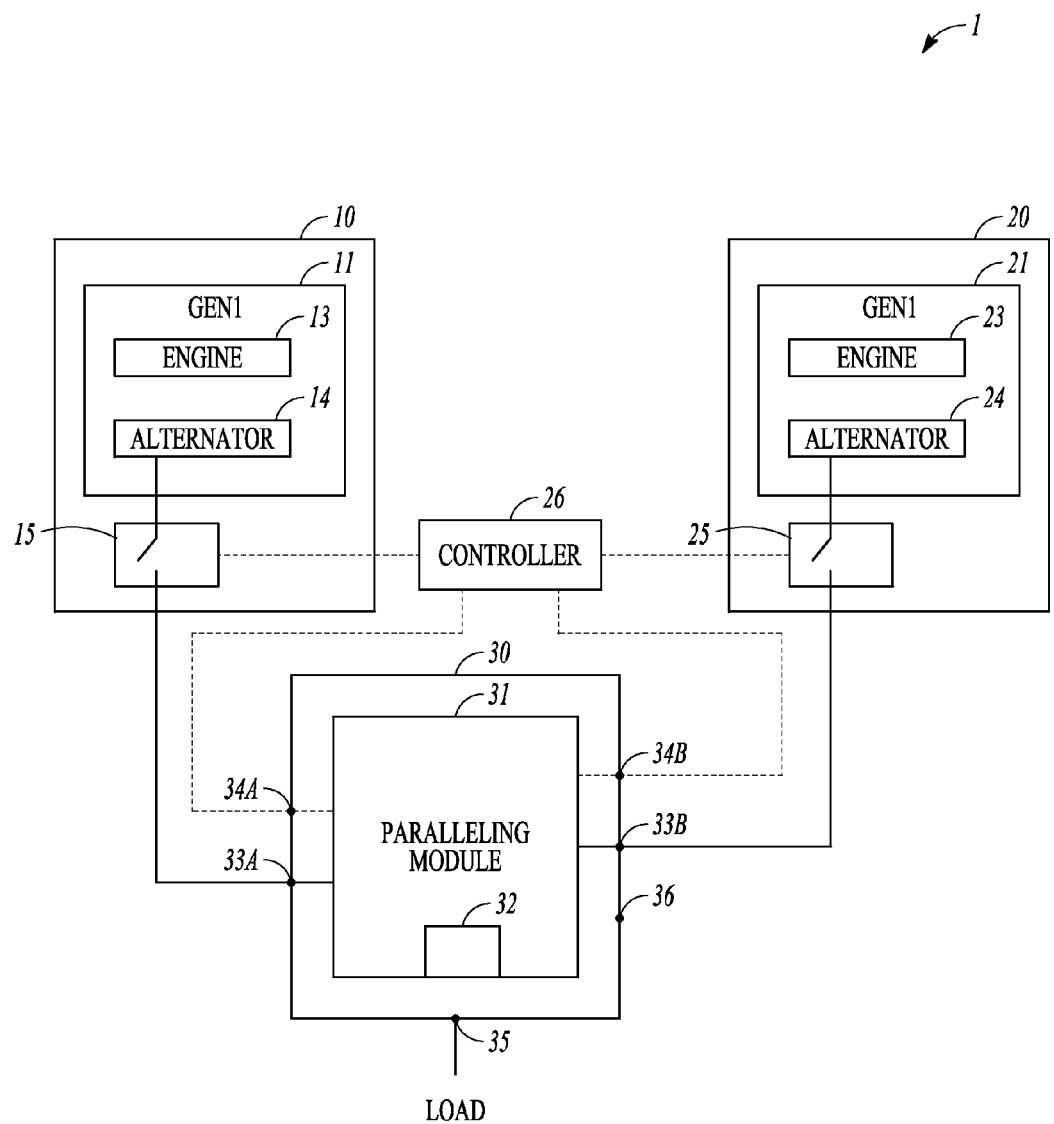
FIG. 4 is a schematic diagram showing an example power management system.

FIG. 4 illustrates another form of the example power management system 1. The power management system 1 includes a first enclosure 10 and a second enclosure 20. A first generator 11 is inside the first enclosure 10 and a second generator 21 is inside the second enclosure 20.

The first generator 11 includes an engine 13 and an alternator 14. A contactor 15 is powered by the alternator 14 to close the contactor 15 in order to provide an electrically conductive path from the alternator 14 to an output 35.

The second generator 21 includes an engine 23 and an alternator 24. A contactor 25 is powered by the alternator 24 to close the contactor 25 in order to provide an electrically conductive path from the alternator 24 to an output 35.

The first and second generators 11, 21 may operate to provide power to output 35 at various times or when various conditions exist. For example, the first and second generators 11, 21 may provide power to the output when a primary power source is not available to provide the primary power, or when the primary power is insufficient to meet power needs. In other situations, the first and second generators 11, 21 may provide secondary power to the output 35 at various other times.

As shown in FIG. 4, the first generator 11 may be inside a first enclosure 10 and the first contactor 15 may also be inside the first enclosure 10. The second generator 21 may be inside a second enclosure 20 and the second contactor 25 may also be inside the second enclosure 20.

The power management system 1 further includes a paralleling enclosure 30 and a paralleling module 31 inside the paralleling enclosure 30. The paralleling module 31 includes at least one switching device 32 within the paralleling enclosure 30 to electrically connect the first generator 11 to the second generator 21. The paralleling enclosure 30 further includes a plurality of connectors 33A, 33B, 35 that permit electrical connection between the paralleling module 31 and the first generator 11 (connector 33A), the second generator 21 (connector 33B) and the output (connector 35) without opening the paralleling enclosure 30.

The contactors described herein may include a coil that is energized to provide an electrical connection with the output or prevent an electrical connection with the outlet. The type and size of contactor may depend on the amount of current that is to pass through the contactor(s) to the output 35. Various types of contactors are possible as long as the contactor receives power from the respective alternator to operate. For example, a controller 26 may send a signal to one, or both of the contactors 15, 25 to provide power to the output 35.

The enclosures 10, 20 may include one or more openings and that permit air to flow into or out of the enclosure. For example, cooling air may be drawn into the enclosure through opening(s), may flow over one or more components inside the enclosure, and may flow out of the enclosure through opening(s). Other variations are possible.

Any of the generators described herein may include an internal combustion engine that is powered by diesel fuel. Other generators may include an external combustion engine, an electric motor, a pneumatic motor, a hydraulic motor, a steam turbine, or various other engines or motors which may produce mechanical energy. In addition, other generators may be powered by a fuel or resource, such as natural gas, propane, gasoline, or various other fuels.

The alternators 14, 24 may be an electromechanical device in communication with the engine 13, 23. The alternators described herein may include or use a rotating magnetic field with a stationary armature, a rotating armature with a stationary magnetic field, or a linear alternator. The alternator may convert the mechanical energy created by the engine to electrical energy, such as alternating current.

The controller 26 may control an operation of the first and second generators 11, 21, such as when the first and second generators 11, 21 are operated or stopped, for how long the first and second generators 11, 21 are operated, the speed or specifications that the first and second generators 11, 21 are operated at, and various other operational specifications. As an example, the controller 26 may determine that the primary power is interrupted or insufficient, and may instruct the first and second generators 11, 21 to run in response to the determination. Other examples are possible.

The controller 26 may communicate with, and use information from one or more sensors in determining the specifications for operating the first and second generators 11, 21. As an example, the controller 26 may receive information from sensors) about one or more parameters of the first and second generators 11, 21, which the controller 26 may use to determine which of the first and second generators 11, 21 to operate in order to meet an overall LOAD that is electrically connected to power management system 1.

The controller 26 may be configured to determine when one, or both of the alternators 14, 24 provides power to one, or both of the contactors 15, 25. The controller 26 may be configured to smartly operate the first and second generators 11, 21. The controller 26 may be configured to match the frequency of the power provided by the generators 11, 21.

Sensor(s) may communicate parameter information to the controller 26 in various ways, such as through a bus, wired communication line, wirelessly, or in various other ways. In some systems, a sensor may be directly coupled to an input of the controller 26. In other systems, the sensor(s) may communicate parameters to the controller 26 indirectly, such as by or through a separate control module. In some of these systems, the separate control module may then communicate the measured parameter information to the controller 26. The controller 26 may then use the parameter information to determine which of the first and second generators 11, 21 to operate in order to meet an overall LOAD.

The controller 26 may receive the parameter information from the sensor(s) continuously, periodically, at intervals, upon request, when triggered by an event, randomly, or at various other times. The controller 26 may control the sensor(s) to control power to the sensor(s) or request a measurement or data about a measurement of the parameter. Other examples are possible.

Figure 5:
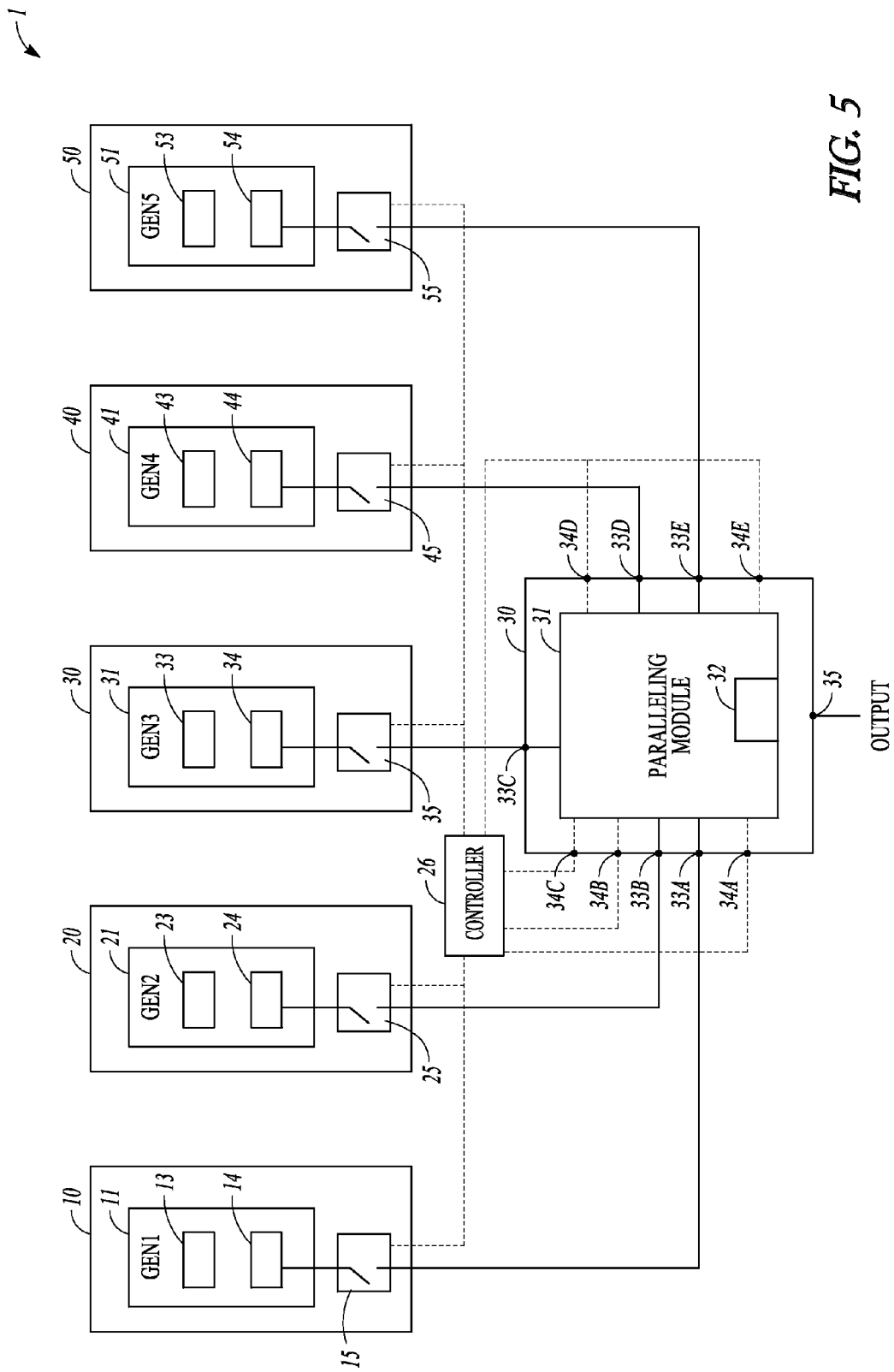
FIG. 5 is a schematic diagram showing the example power management system of FIG. 4 where the power management system includes additional generators and contactors.

FIG. 5 is a schematic diagram showing the example power management system 1 of FIG. 4 where the power management system 1 includes additional generators 31, 41, 51 inside respective enclosures 30, 40, 50. The additional generators 31, 41, 51 each include respective engines 33, 43, 53 and alternators 34, 44, 54. The example power management system 1 further includes contactors 35, 45, 55 inside the respective enclosures 30, 40, 50.

The controller 26 may send a signal to one, some or all of the contactors 15, 25, 35, 45, 55 to provide power to the output 35. The controller 26 may communicate with, and use information from one or more sensors in determining the specifications for operating each of the generators 11, 21, 31, 41, 51. The controller 26 may be configured to match the frequency of the power provided by each of the generators 11, 21, 31, 41, 51.

Figure 6:
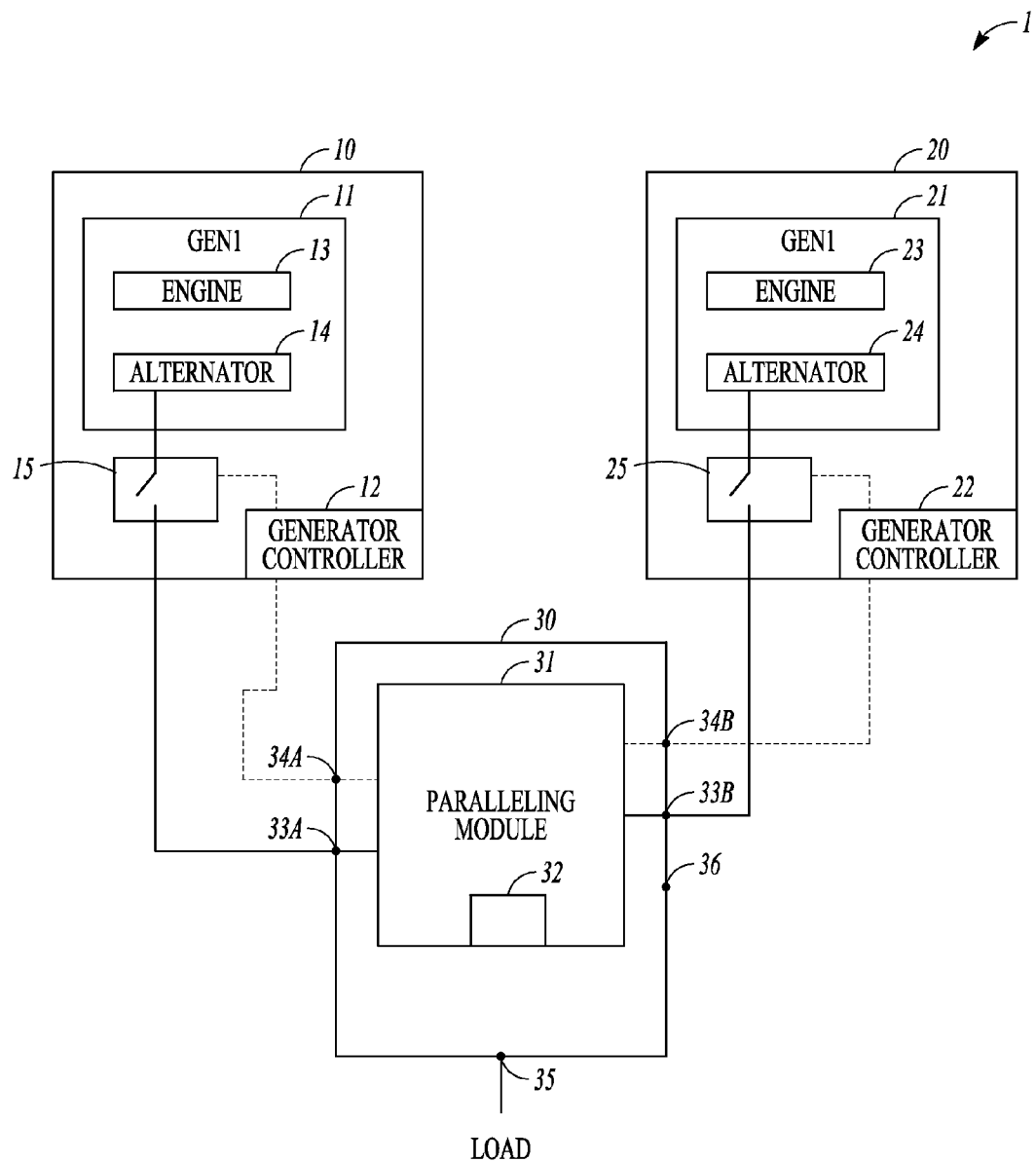
FIG. 6 is a schematic diagram showing another example power generation system where each generator includes a corresponding generator controller.

FIG. 6 shows another example power generation system 1 where each generator 11, 21 includes a corresponding generator controller 12, 22. Each generator controller 12, 22 may be configured to operate at least one (or both) of the first generator 11 or the second generator 21. The generator controller 12 may be configured to operate the first generator and the generator controller 22 may be configured to operate the second generator 22. One, or both, of the generator controllers 12, 22 may be configured to match the frequency of the power provided by the first generator 11 and the second generator 21.

Each generator controller 21, 22 may be configured to determine when one, or both of the alternators 14, 24 provides power to one, or both of the contactors 15, 25. The generator controller(s) 21, 22 may be configured to smartly operate the first and second generators 11, 21. Alternatively, one of the generator controllers 21, 22 may be configured to determine when one, or both of the alternators 14, 24 provides power to one, or both of the contactors 15, 25. Each generator controller 12, 22 may disconnect the generators 11, 21 by activating (or deactivating) the contactors 15, 25 because power may not be required of all of the generators 21, 22.

Figure 7:
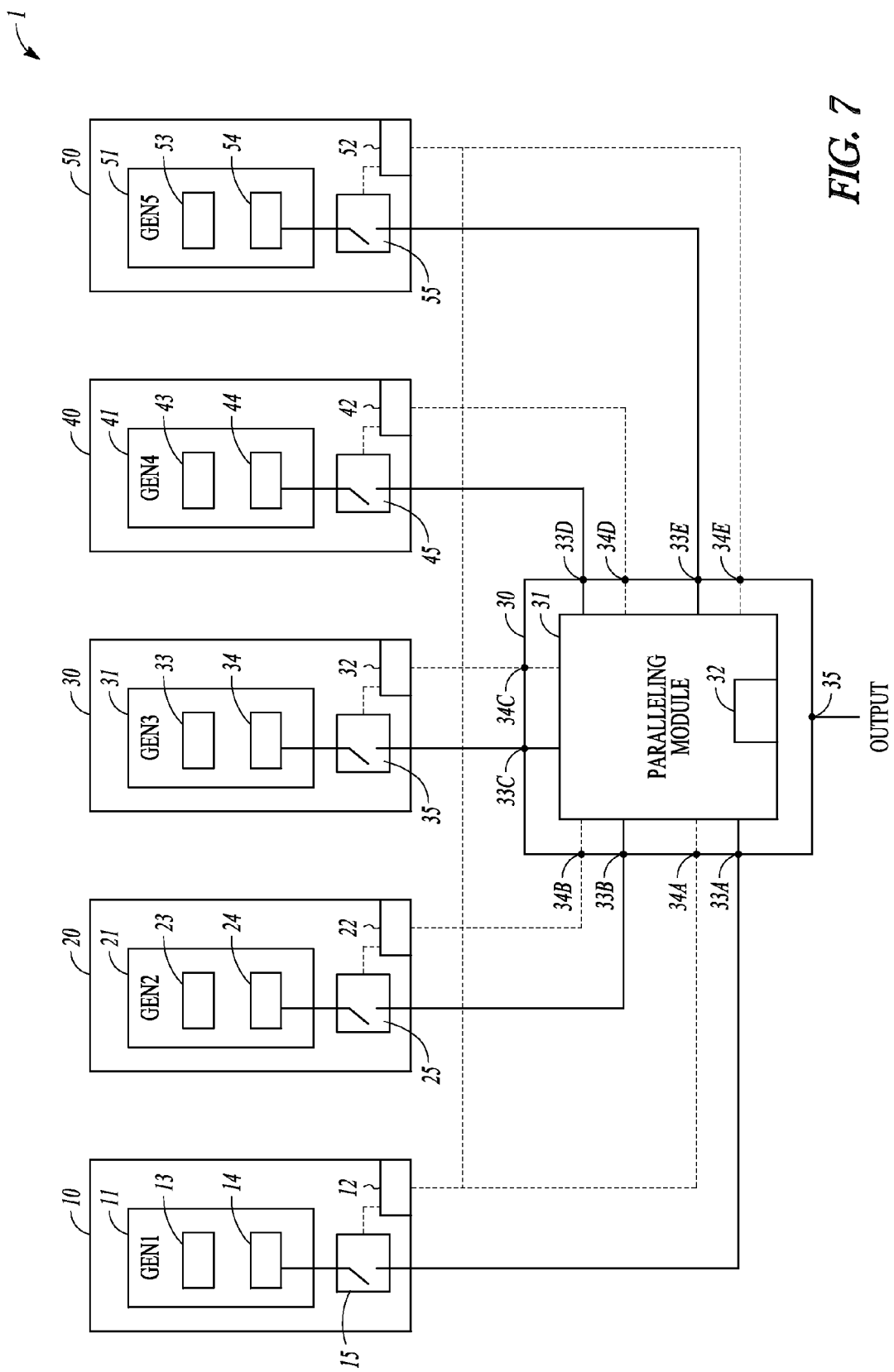
FIG. 7 is a schematic diagram showing the example power management system of FIG. 6 where the power management system includes additional generators, contactors and generator controllers.

FIG. 7 is a schematic diagram showing the example power management system 1 of FIG. 6 where the power management system 1 includes additional generators 31, 41, 51 inside respective enclosures 30, 40, 50. The additional generators 31, 41, 51 each include respective engines 33, 43, 53 and alternators 34, 44, 54. The example power management system 1 further includes contactors 35, 45, 55 and generator controllers 32, 42, 52 inside the respective enclosures 30, 40, 50.

One, some or all of the generator controllers 12, 22, 32, 42, 52 may send a signal to one, some or all of the contactors 15, 25, 35, 45, 55 to provide power to the output 35. The generator controllers 12, 22, 32, 42, 52 may communicate with, and use information from one or more sensors in determining the specifications for operating each of the generators 11, 21, 31, 41, 51. One, some or all, of the generator controllers 12, 22, 32, 42, 52 may be configured to match the frequency of the power provided by each of the generators 11, 21, 31, 41, 51.

Figure 8:
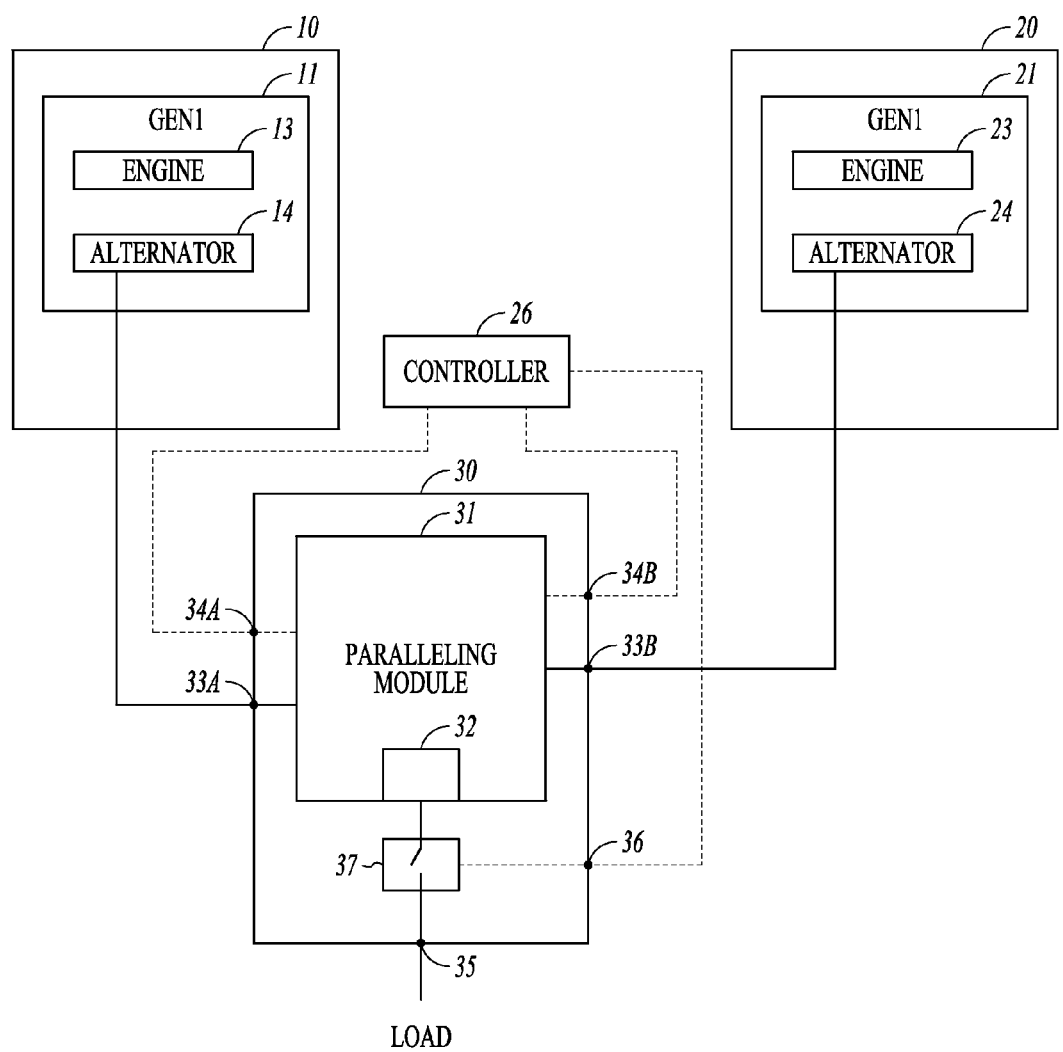
FIG. 8 is a schematic diagram similar to FIG. 4 where a contactor is included inside a paralleling enclosure.

FIG. 8 is a schematic diagram similar to FIG. 4 where a contactor 37 is included inside the paralleling enclosure 30. The contactor 37 may be powered by one, or both, of the alternators 14, 24 to close the contactor 37 in order to provide an electrically conductive path from the alternator(s) 14, 24 to the output 35. The type and size of contactor 37 may depend on the amount of current that is to pass through the contactor 37 to the output 35.

For example, the controller 26 may send a signal to the contactor 37 to provide power to the output 35. The controller 26 may be configured to determine when one, or both of the alternators 14, 24 provides power to the contactor 37. The controller 26 may be configured to match the frequency of the power provided by the generators 11, 21 before activating or deactivating the contactor 37 to provide power to the output 35.

Figure 9:
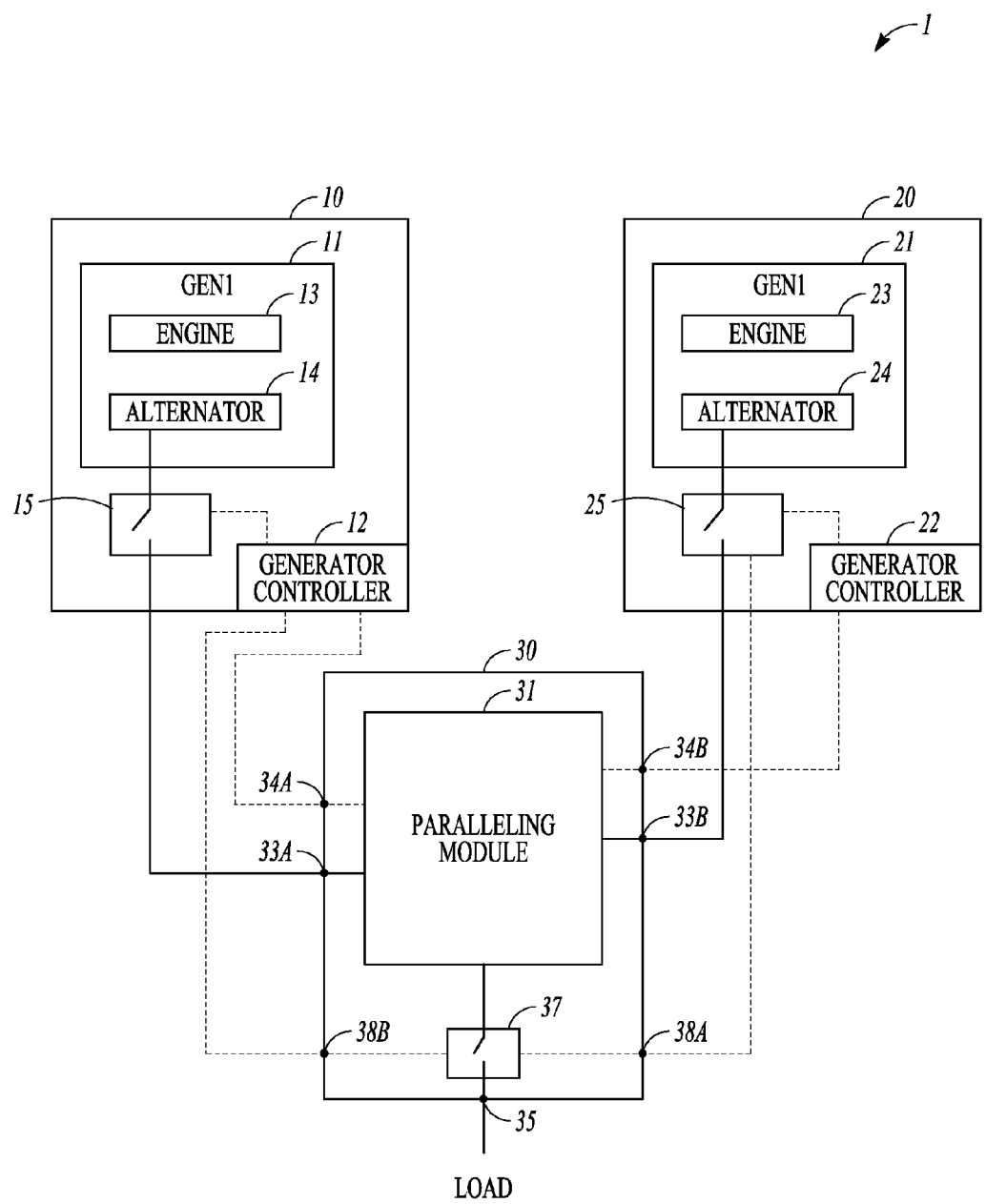
FIG. 9 is a schematic diagram similar to FIG. 6 where a contactor is included inside a paralleling enclosure.

FIG. 9 is a schematic diagram similar to FIG. 6 where a contactor 37 is included inside the paralleling enclosure 30. The contactor 37 may be powered by one, or both, of the alternators 14, 24 to close the contactor 37 in order to provide an electrically conductive path from the alternator(s) 14, 24 to the output 35.

For example, one, or both, of the generator controllers 12, 22 may send a signal to the contactor 37 to provide power to the output 35. The generator controllers 12, 22 may be configured to determine when one, or both of the alternators 14, 24 provides power to the contactor 37. The generator controllers 12, 22 may be configured to match the frequency of the power provided by the generators 11, 21 before activating (or deactivating) the contactor 37 to provide power to the output 35.

Figure 10:
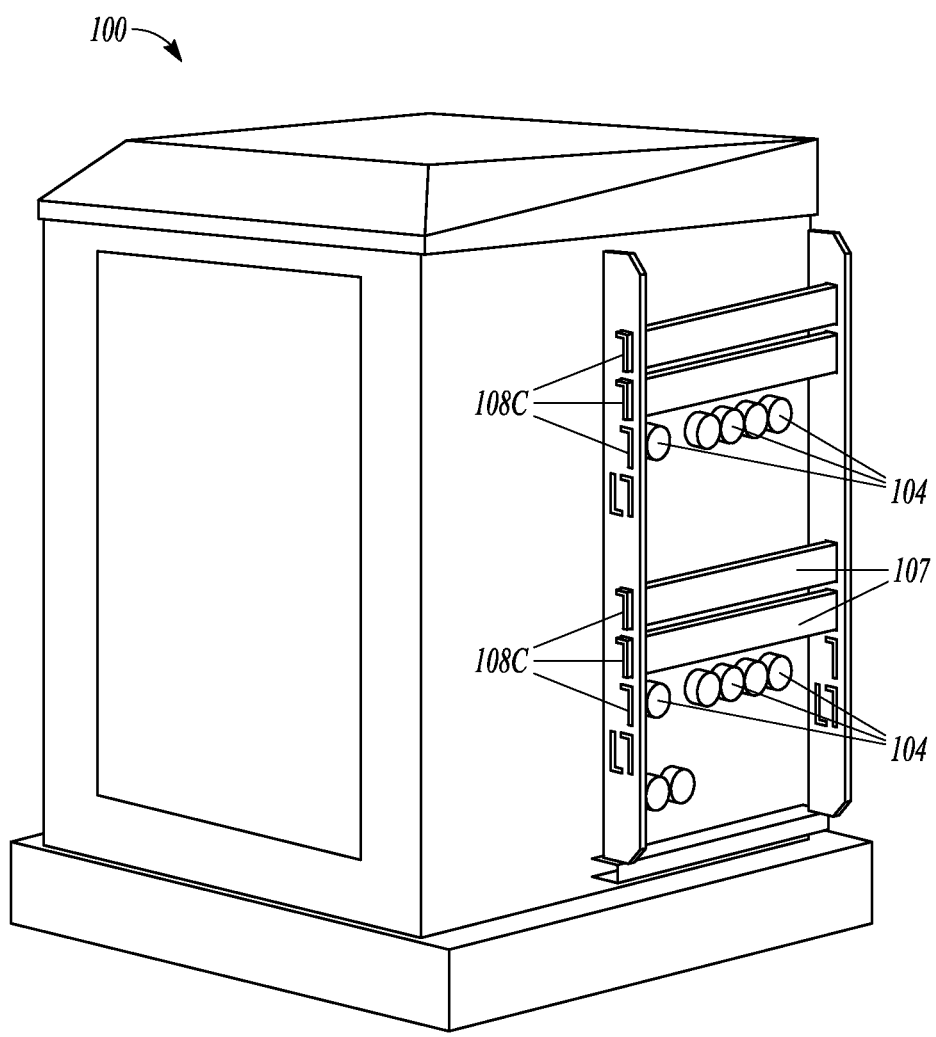
FIG. 10 is a perspective view of an example paralleling enclosure.
Figure 11:
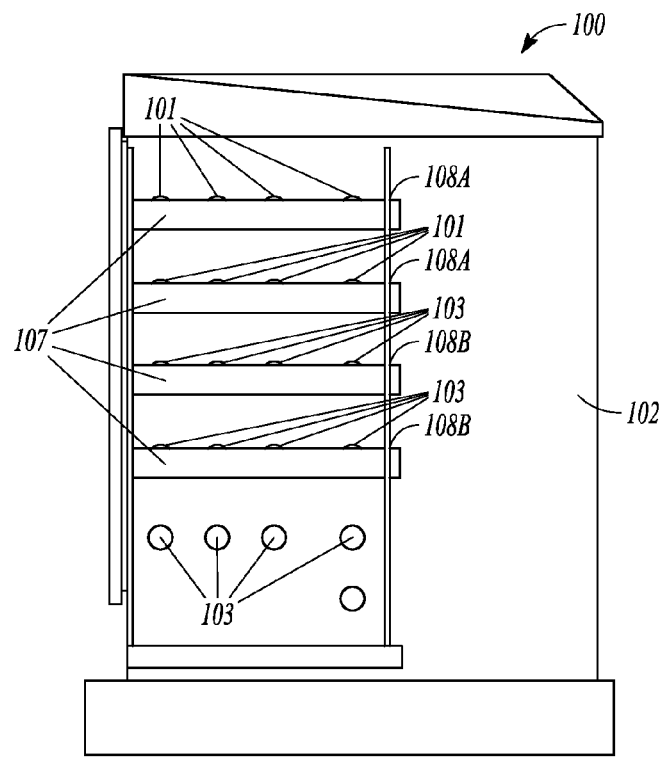
FIG. 11 is a left side view of the example paralleling enclosure shown in FIG. 10.
Figure 12:
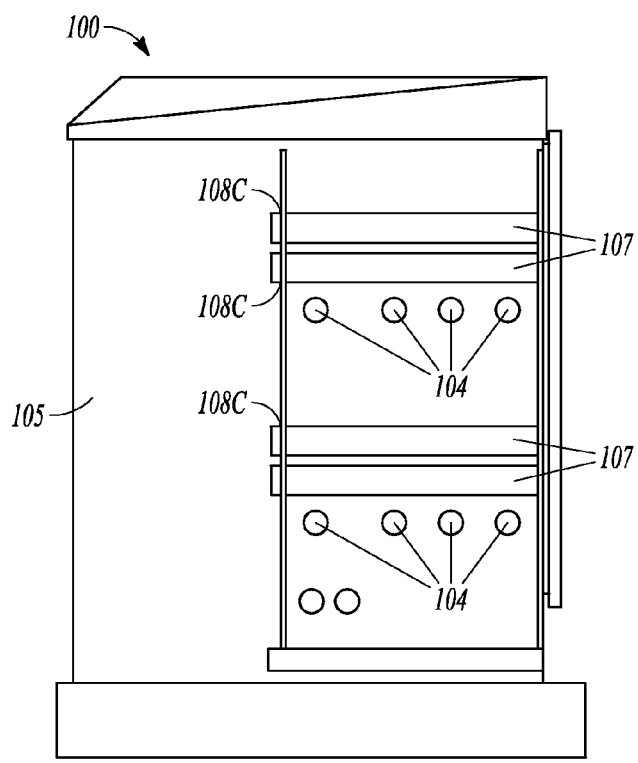
FIG. 12 is a right side view of the example paralleling enclosure shown in FIG. 10.

FIG. 10 is a perspective view of an example paralleling enclosure 100. FIG. 11 is a left side view of the example paralleling enclosure 100 shown in FIG. 10. FIG. 12 is a right side view of the example paralleling enclosure 100 shown in FIG. 10.

The example paralleling enclosure 100 includes a first input connector 101 (or connectors 101) (see FIG. 11). The first input connectors 101 are positioned on a first side 102 of the paralleling enclosure 100. The first input connectors 101 are configured to selectively receive power from a first generator (e.g., generator 11).

The example paralleling enclosure 100 further includes a second input connector 103 (or connectors 103). The second input connectors 103 are positioned on the first side 102 of the paralleling enclosure 100 and configured to selectively receive power from a second generator (e.g., generator 21).

The example paralleling enclosure 100 further includes an output connector 104 (or connectors 104) that are electrically connected to the first and second input connectors 101, 103 (see FIGS. 10 and 12). The output connectors 104 are positioned on a second side 105 of the paralleling enclosure 100.

The output connectors 104 may be configured to be connected to a LOAD (see, e.g., FIGS. 4-9). Alternatively, the output connectors 104 may be configured to be connected to a plurality of loads. The output connectors 104 may also be configured to be connected as inputs to one or more other paralleling enclosures.

In the example paralleling enclosure 100 illustrated in FIGS. 10-12, the first side 102 of the paralleling enclosure 100 and the second side 105 of the paralleling enclosure 100 are opposing sides of paralleling enclosure 100. Alternatively, the first side 102 of the paralleling enclosure 100 and the second side 105 of the paralleling enclosure 100 may be adjacent sides of paralleling enclosure 100.

Forms of paralleling enclosure 100 are contemplated where the first side 102 of the paralleling enclosure 100 may be a front, left, right, back, top or bottom of the paralleling enclosure 100. In addition, the second side 105 of the paralleling enclosure 100 may be a front, left, right, back, top or bottom of the paralleling enclosure 100.

The first input connectors 101, the second input connectors 103 and the output connectors 104 may be a variety of different types of connectors. In addition, the first input connectors 101, the second input connectors 103 and the output connectors 104 may be different types of connectors, or all be the same type of connector. For example, the first input connectors 101, the second input connectors 103 and the output connectors 104 may all be cam locks as shown in FIGS. 10-14.

Figure 13:
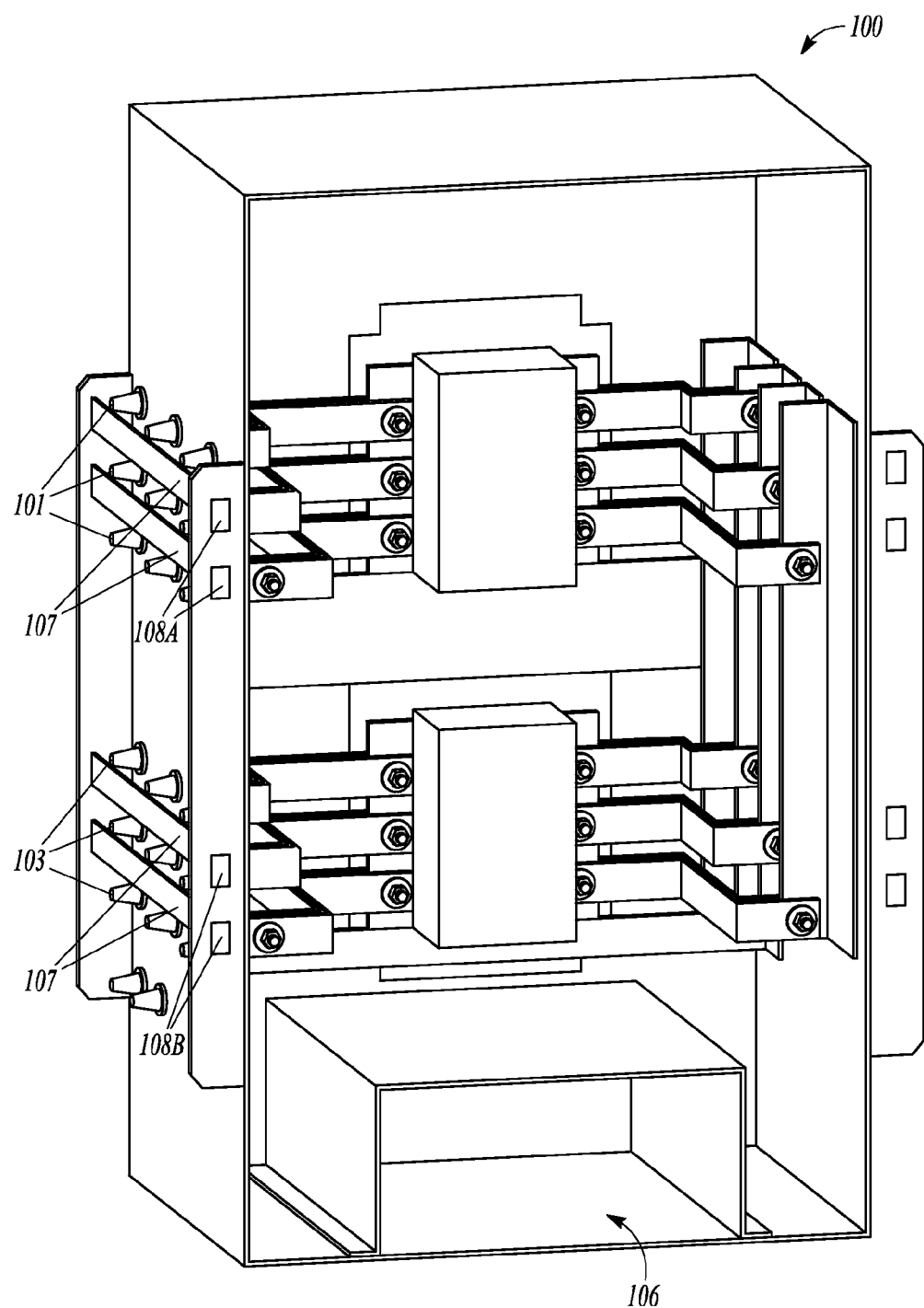
FIG. 13 is a perspective view of an interior of an example paralleling enclosure.
Figure 14:
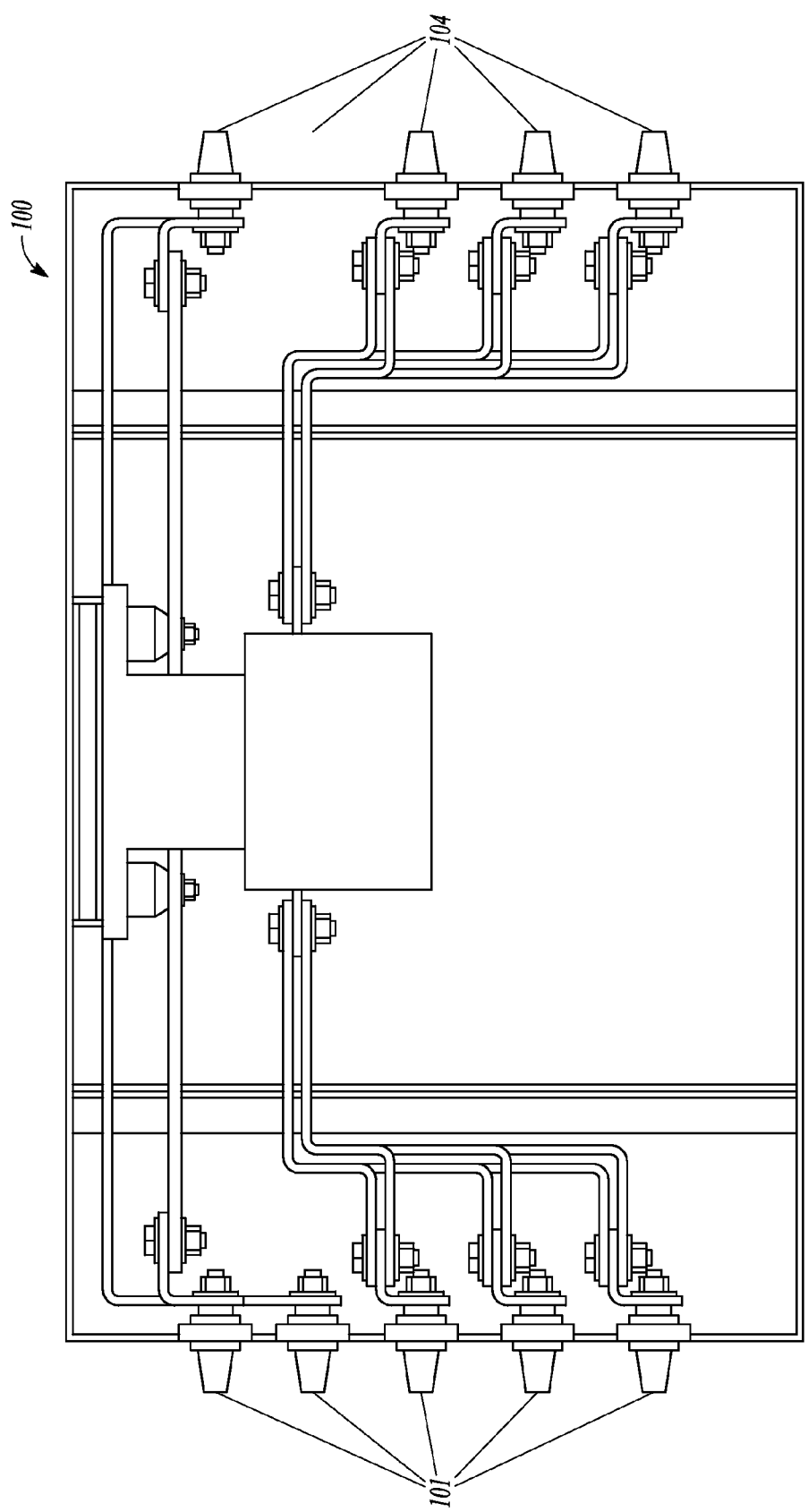
FIG. 14 is a top view of the interior of the example paralleling enclosure shown in FIG. 13.
Figure 15:
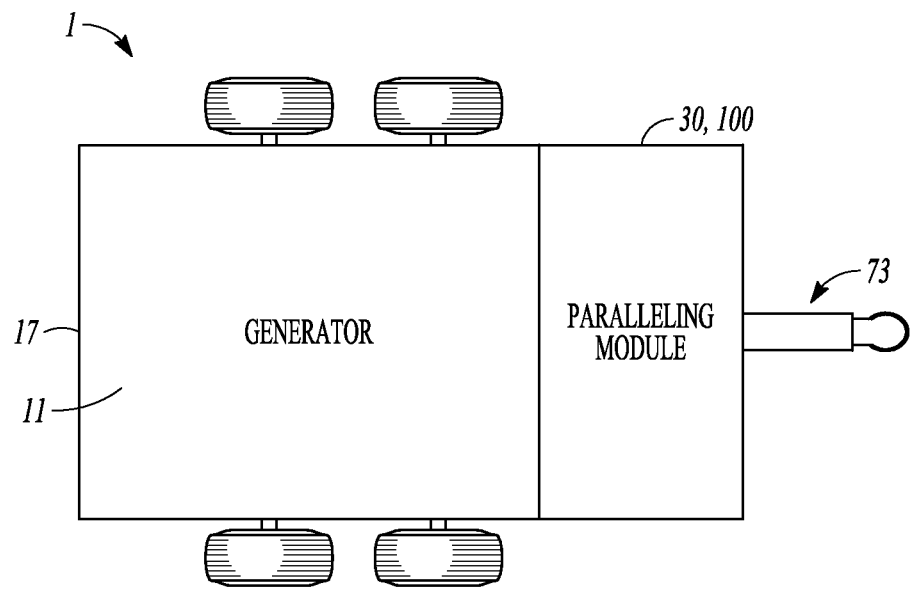
FIGS. 15-18 show an example power management system that includes a trailer configured to be attached to a vehicle where an example paralleling enclosure is mounted on the trailer.
Figure 16:
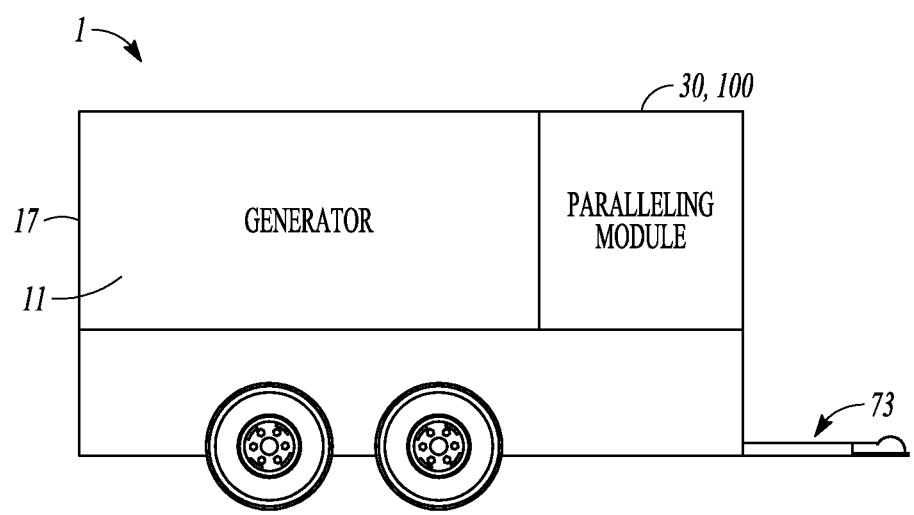
Figure 17:
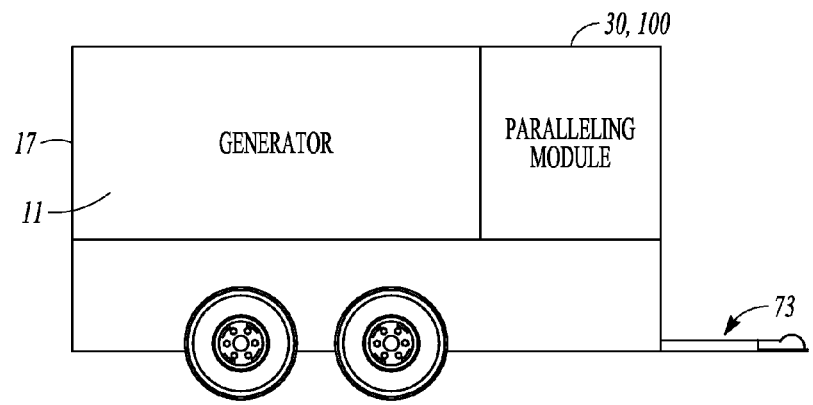
Figure 18:
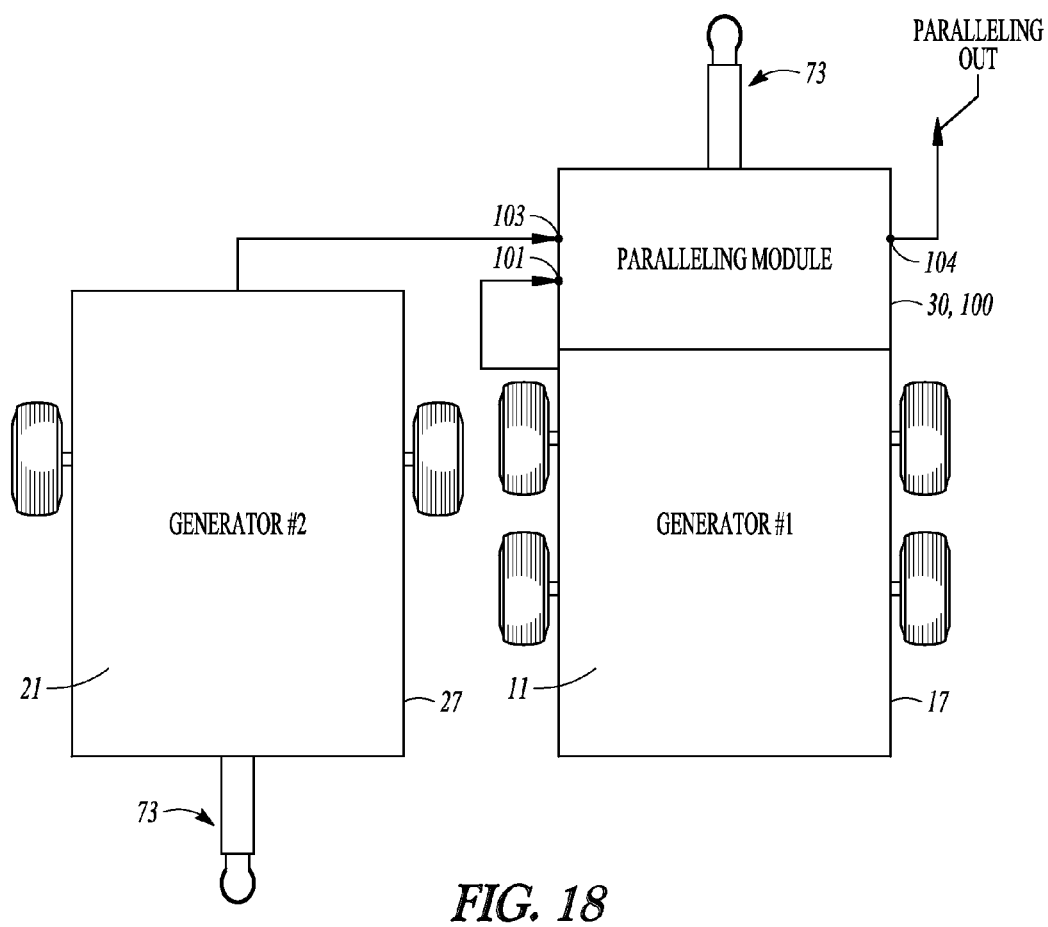

FIG. 13 is a perspective view of an interior of the example paralleling enclosure 100. FIG. 14 is a top view of the interior of the example paralleling enclosure 100 shown in FIG. 13.

The illustrated interior of the paralleling enclosure 100 is just one of many various examples of how the first input connectors 101 and the second input connectors 103 may be electrically connected the output connectors 104. The example paralleling enclosure 100 that is shown in FIG. 13 may also include a storage compartment 106 for storing various cables or other tools, components, etc.

As shown in FIGS. 4-9, a paralleling module 31 may be included inside the paralleling enclosure 100. The paralleling module 31 may be configured to electrically connect the first generator 11 and the second generator 21 in parallel.

The paralleling module 31 may be located anywhere inside the paralleling enclosure (30 or 100). In addition, the paralleling module 31 may be configured to match the frequencies of the power provided to the first input connectors 101 by the first generator 11 and the power provided to the second input connectors 103 by the second generator 21 before supplying power to the output connectors 104.

As shown in FIGS. 10-13, the paralleling enclosure 100 may include one or more protective bars 107 and a plurality of protective bar holders 108A, 108B, 108C. For example, the paralleling enclosure 100 may include one or more first input connector protective bar holders 108A that are adjacent the first input connector(s) 101, and one or more second input connector protective bar holders 108B that are adjacent the second input connector(s) 103. The paralleling enclosure 100 may further include one or more output connector protective bar holders 108C adjacent the output connector(s) 104.

Each of the protective bar holders 108A, 108B, 108C are configured to receive the protective bar(s) 107 and cover the respective first and second input connector(s) 101, 103 or output connector(s) 104 when the protective bar 107 is received in the respective protective bar holders 108A, 108B, 108C. The protective bars 107 may be configured to be interchangeably connected to any of the protective bar holders 108A, 108B, 108C and cover any of the first input connector(s) 101, the second input connector(s) 103, or the output connector(s) 104.

In some forms, the protective bars 107 may all have the same configuration. In other forms, the protective bars 107 may all have different configurations. Other variations are possible.

In some forms, the protective bar holders 108A, 108B, 108C may all have the same configurations. In other forms, the protective bar holders 108A, 108B, 108C may all have different configurations. Other variations are possible.

The protective bars 107 may serve to reduce the chance of undesirable connecting any other electronic components to the paralleling enclosure 100. In addition, when the protective bars 107 have the same configuration and the protective bar holders 108A, 108B, 108C have the same configuration, the protective bars 107 may be interchangeably used with any of the protective bar holders 108A, 108B, 108C.

The first input connector 101 may be configured to be electrically connected to the first generator 11. The second input connector 103 may be configured to be electrically connected to the second generator 21 and the output connector 104 may be configured to be electrically connected to a LOAD without opening the paralleling enclosure 100.

As shown in FIGS. 15-18, the power management system 1 may further include a trailer 73 configured to be attached to a vehicle (not shown) that is adapted to tow the trailer 73. A base (e.g., a skid) is attached to the trailer such that the one, or both, of the first and second enclosures 10, 20 are mounted on the base. In the illustrated example embodiments, the trailer 73 includes one or more axles, wheels, a frame and a tongue for attaching the trailer 73 to a towing vehicle.

Various forms of the power management system 1 may also include the paralleling enclosure 30, 100 mounted on the trailer 73. In the example forms shown in FIGS. 15-18, the paralleling enclosure 30, 100 is mounted in front of the first enclosure 10 on the trailer 73. Other forms are possible where the paralleling enclosure 30, 100 is mounted in back of the first enclosure 10 on the trailer 73 or on the side of the first enclosure 10 on the trailer 73. Other variations are possible.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A power management system comprising:
   a first generator that includes an engine and an alternator; and
   a contactor that is powered by the alternator to close the contactor in order to provide an electrically conductive path from the alternator to an output;
   a second generator that includes an engine and an alternator, wherein the first generator is inside a first enclosure and the contactor is a first contactor that is inside the first enclosure;
   a second contactor that is powered by the alternator of the second generator to close the second contactor in order to provide an electrically conductive path from the alternator of the second generator to the output; and
   a second enclosure, wherein the second generator and the second contactor are inside the second enclosure,
   a paralleling enclosure that electrically connects the first generator and the second generator in parallel, wherein the paralleling enclosure includes the output; and
   a trailer including at least two wheels, wherein the paralleling enclosure is secured to the trailer.

2. The power management system of claim 1, further comprising:
   a controller that operates at least one of the first generator or the second generator;
   where the controller is configured to match the frequency of the power provided by the first generator and the second generator.

3. The power management system of claim 2, wherein the contactor is within the paralleling enclosure such that the controller is configured to close the contactor to provide power from the first and/or second generators to the output of the paralleling enclosure.

4. The power management system of claim 1, further comprising:
   a first generator controller that operates the first generator, the first generator controller within the first enclosure;
   a second generator controller that operates the second generator, the second generator controller within the second enclosure; and
   where at least one of the first and second generator controllers are configured to match the frequency of the power provided by the first generator and the second generator.

5. The power management system of claim 4, wherein the contactor is within the paralleling enclosure such that at least one of the first and second generator controllers configured to close the contactor to provide power from the first and/or second generators to the output of the paralleling enclosure.

6. A paralleling enclosure comprising:
   a first input connector positioned on a first side of the paralleling enclosure and configured to selectively receive power from a first generator;
   a second input connector positioned on the first side and configured to selectively receive power from a second generator;
   an output connector electrically connected to the first and second input connector, the output connector positioned on a second side of the paralleling enclosure; and
   a paralleling module inside the paralleling enclosure, the paralleling module configured to electrically connect the first generator and the second generator in parallel.

7. The paralleling enclosure of claim 6, wherein the paralleling module is configured to match the frequencies of the power provided by the first generator and the power provided by the second generator before supplying power to the output.

8. The paralleling enclosure of claim 6, wherein the first side of the paralleling enclosure and the second side of the paralleling enclosure are opposing sides of paralleling enclosure.

9. The paralleling enclosure of claim 6, wherein the output connector is configured to be connected to a load.

10. A paralleling enclosure comprising:
    a first input connector positioned on a first side of the paralleling enclosure and configured to selectively receive power from a first generator;
    a second input connector positioned on the first side and configured to selectively receive power from a second generator;
    an output connector electrically connected to the first and second input connector, the output connector positioned on a second side of the paralleling enclosure; and
    wherein the first input connector, the second input connector and the output connector are cam locks.

11. A paralleling enclosure comprising:
    a first input connector configured to selectively receive power from a first generator;

a second input connector configured to selectively receive power from a second generator;

an output connector electrically connected to the first and second input connector;

a protective bar;

a plurality of protective bar holders, including a first input connector protective bar holder adjacent the first input connector, a second input connector protective bar holder adjacent the second input connect, and an output connector protective bar holder adjacent the output connector; and wherein each of the protective bar holders are configured to receive the protective bar and cover the respective input connector or output connector when the protective bar is received.

12. The paralleling enclosure of claim 11, wherein the protective bar is configured to be interchangeably connected to any of the protective bar holders and cover any of the first input connector, the second input connector, or the output connector.

13. The paralleling enclosure of claim 11, wherein the first input connector is configured to be electrically connected to the first generator, the second input connector is configured to be electrically connected to the second generator, and the output connector is configured to be electrically connected to a load without opening the paralleling enclosure.

\* \* \* \* \*